United States Patent
Frank (10) Patent No.: US 11,047,109 B2
(45) Date of Patent: Jun. 29, 2021

(54) CONTROL UNIT FOR DUMPING OF MATERIAL

(71) Applicant: VOLVO CONSTRUCTION EQUIPMENT AB, Eskilstuna (SE)

(72) Inventor: Martin Frank, Mehlingen (DE)

(73) Assignee: Volvo Construction Equipment AB, Eskilstuna (SE)

( * ) Notice: Subject to any disclaimer, the term of this patent is extended or adjusted under 35 U.S.C. 154(b) by 347 days.

(21) Appl. No.: 16/094,024

(22) PCT Filed: Apr. 19, 2016

(86) PCT No.: PCT/SE2016/050338
§ 371 (c)(1),
(2) Date: Oct. 16, 2018

(87) PCT Pub. No.: WO2017/184037
PCT Pub. Date: Oct. 26, 2017

(65) Prior Publication Data
US 2019/0106859 A1    Apr. 11, 2019

(51) Int. Cl.
*E02F 3/43*    (2006.01)
*E02F 9/20*    (2006.01)

(52) U.S. Cl.
CPC ............ *E02F 3/435* (2013.01); *E02F 9/2029* (2013.01); *E02F 9/2041* (2013.01); *E02F 3/438* (2013.01)

(58) Field of Classification Search
CPC ......... E02F 3/435; E02F 3/438; E02F 9/2029; E02F 9/2041; G05D 1/0251
USPC ............................................... 701/50, 28, 49
See application file for complete search history.

(56) References Cited

U.S. PATENT DOCUMENTS

| 6,076,030 A | 6/2000 | Rowe |
| 6,114,993 A * | 9/2000 | Henderson ............... G01S 19/14 |
| | | 342/357.27 |
| 6,205,687 B1 * | 3/2001 | Rocke ..................... E02F 3/431 |
| | | 37/348 |

(Continued)

FOREIGN PATENT DOCUMENTS

| JP | H 11293708 | 10/1999 |
| WO | 2005103396 A1 | 11/2005 |
| WO | 2012201131 A1 | 12/2014 |

OTHER PUBLICATIONS

First Chinese Office Action dated Aug. 19, 2020 for Chinese Patent Application No. 201680084700.0, 19 pages (including English translation).

(Continued)

*Primary Examiner* — Richard A Goldman
(74) *Attorney, Agent, or Firm* — Sage Patent Group (57) ABSTRACT

A control unit is provided for controlling the dumping of a material entity from an implement of a working machine into a receiver. The control unit is adapted to determine a loading operation information including a current loading condition indicative of the distribution of the material that is currently accommodated by the receiver, and material characteristic information comprising one or more properties of the material of the material entity that is present in the implement. The control unit is adapted to, on the basis of the loading operation information, determine a dumping position within the receiver at which dumping position the material entity is to be dumped.

37 Claims, 7 Drawing Sheets

(56) References Cited

U.S. PATENT DOCUMENTS

| | | | | |
|---|---|---|---|---|
| 6,211,471 | B1 | 4/2001 | Rocke et al. | |
| 6,363,632 | B1* | 4/2002 | Stentz | E02F 3/437 37/414 |
| 8,903,689 | B2* | 12/2014 | Dunbabin | E02F 9/265 703/6 |
| 10,830,634 | B2* | 11/2020 | Blank | G01G 19/086 |
| 2007/0135985 | A1* | 6/2007 | Berry | E02F 9/2029 701/50 |
| 2008/0005938 | A1* | 1/2008 | Aebischer | E02F 9/26 37/413 |
| 2010/0245542 | A1* | 9/2010 | Kim | G01B 11/00 348/46 |
| 2012/0136542 | A1* | 5/2012 | Upcroft | E02F 3/48 701/50 |
| 2012/0201847 | A1 | 8/2012 | Hagenkich et al. | |
| 2012/0265412 | A1* | 10/2012 | Diekhans | A01D 43/086 701/50 |
| 2013/0211658 | A1* | 8/2013 | Bonefas | B65G 67/24 701/28 |
| 2013/0211675 | A1* | 8/2013 | Bonefas | B62D 12/02 701/41 |
| 2013/0213518 | A1* | 8/2013 | Bonefas | A01D 75/00 141/1 |
| 2014/0088822 | A1* | 3/2014 | Jensen | G01N 9/36 701/34.4 |
| 2014/0224377 | A1* | 8/2014 | Bonefas | A01D 43/073 141/1 |
| 2014/0231153 | A1* | 8/2014 | Fukasu | B60P 1/00 177/25.13 |
| 2014/0277963 | A1* | 9/2014 | Van Mill | G05B 19/409 701/50 |
| 2014/0288771 | A1* | 9/2014 | Li | G06K 9/00791 701/34.4 |
| 2014/0311113 | A1* | 10/2014 | Bonefas | A01D 34/001 56/10.2 R |
| 2014/0350801 | A1* | 11/2014 | Bonefas | G06T 7/593 701/50 |
| 2016/0187182 | A1* | 6/2016 | Beltramin | G01F 22/00 177/177 |
| 2016/0292846 | A1* | 10/2016 | Sprock | G06T 7/001 |
| 2017/0121929 | A1* | 5/2017 | Martinez | E02F 9/2025 |
| 2017/0130405 | A1* | 5/2017 | Engelmann | E02F 9/261 |
| 2017/0191246 | A1* | 7/2017 | Friend | E02F 9/265 |
| 2017/0206645 | A1* | 7/2017 | Bonefas | G06T 7/62 |
| 2018/0106709 | A1* | 4/2018 | Cherney | G01F 22/00 |
| 2018/0187383 | A1* | 7/2018 | Anheier | E01C 19/48 |
| 2018/0239849 | A1* | 8/2018 | Martinsson | G06K 9/00214 |
| 2019/0023170 | A1* | 1/2019 | Meitinger | B60P 1/162 |
| 2019/0026914 | A1* | 1/2019 | Hageman | E02F 9/2029 |
| 2019/0106859 | A1* | 4/2019 | Frank | G01F 22/00 |
| 2019/0124838 | A1* | 5/2019 | Dilts | A01D 41/1276 |
| 2019/0166761 | A1* | 6/2019 | Conrad | A01D 41/1275 |
| 2019/0277687 | A1* | 9/2019 | Blank | B60W 40/107 |
| 2019/0331481 | A1* | 10/2019 | Flood | G01P 13/02 |
| 2020/0032488 | A1* | 1/2020 | Kean | E02F 9/2033 |
| 2020/0087893 | A1* | 3/2020 | Hageman | E02F 3/32 |
| 2020/0262325 | A1* | 8/2020 | Karg | B60P 1/16 |

OTHER PUBLICATIONS

International Search Report (dated Feb. 15, 2017) for corresponding International App. PCT/SE2016/050338.

Anthony Stentz, John Bares, Sanjiv Singh and Patrick Rowe, A Robotic Excavator for Autonomous Truck Loading, Proceedings of the IEEE/RSJ International Conference on Intelligent Robotic Systems, 1998.

European Search Report (dated Nov. 19, 2019) for corresponding International App. PCT/SE2016050338, 11 pages.

European Extended Search Reported dated Nov. 19, 2019 for European Patent Application No. 16899589.2, 11 pages.

* cited by examiner

CONTROL UNIT FOR DUMPING OF MATERIAL

BACKGROUND AND SUMMARY

The present invention relates to a control unit for controlling the dumping of a material entity from an implement of a working machine into a receiver. Moreover, the present invention relates to a control assembly for controlling the dumping of a material entity from an implement of a working machine into a receiver. Further, the present invention relates to a method for controlling the dumping of a material entity from an implement of a working machine into a receiver. Additionally, the present invention relates to a computer program and a computer readable medium.

A working machine may be used for many purposes. An example of one purpose is filling a receiver. Examples of working machines include, but are not limited to, wheel loaders and excavators. Moreover, examples of receivers include, but are not limited to, haulers, trailers and trucks. Generally, the working machine comprises an implement, such as bucket, for moving material from a material source, such as a pile, to the receiver.

Traditionally, an operator of the working machine has controlled the filling of the receiver using a predetermined filling strategy, possibly in combination with the operator's personal experience.

For e.g. safety or cost reasons, it may be desirable to automate the receiver filling procedure. An example of an automated working machine is presented in "A Robotic Excavator for Autonomous Truck Loading" by Anthony Stentz, John Bares, Sanjiv Singh and Patrick Rowe of the Robotics Institute at Carnegie Mellon University, Pittsburgh, U.S.

However, it may be desired to further improve the working machine as proposed in the above article.

It is desirable to provide a control unit for controlling the dumping of a material entity from an implement of a working machine into a receiver such that an appropriate loading condition of the receiver is obtained.

As such, the present invention relates, according to an aspect thereof, to a control unit for controlling the dumping of a material entity from an implement of a working machine into a receiver.

According to an aspect of the present invention, the control unit is adapted to determine a loading operation information comprising:

a current loading condition indicative of the distribution of the material that is currently accommodated by the receiver, and a material characteristic information comprising one or more properties of the material of the material entity that is present in the implement.

The control unit is adapted to, on the basis of the loading operation information, determine a dumping position within the receiver at which dumping position the material entity is to be dumped.

The above control unit, which determines both the current loading condition and the material characteristic information of the material entity currently loaded into the implement, implies that the dumping position can be determined taking several conditions into account. For instance, if a specific distribution of the material accommodated in the receiver is detected, the control unit may select a dumping position that takes such a material distribution into account. As another example, if a specific material characteristic information of a property of the material entity is detected, for instance an indication whether the material entity is relatively solid or relatively fluid, an appropriate dumping position may be selected accordingly.

Optionally, the material entity comprises or substantially consists of granular material such as at least one of sand, soil, clay, earth and gravel. A granular material in accordance with the above examples may have varying degrees of solidity/fluidity and it may thus be preferred to determine a material characteristic information comprising one or more properties of a material entity if the material comprises granular material.

Optionally, the control unit is adapted to determine the dumping position, on the basis of the loading operation information, each time a new material entity is intended to be dumped into the receiver.

When moving material from a source of material, the material characteristics may be different for each material entity that is moved from the material source to the receiver. Since the different material characteristics may result in different preferred dumping positions, it is advantageous to determine a dumping position on the basis of the loading operation information, comprising material characteristic information in turn comprising one or more properties of the material of the material entity that is present in the implement, each time a new material entity is intended to be dumped into the receiver.

Optionally, the material characteristic information comprises information indicative of how the material entity will spread out when dumped from the implement. The material entity's ability to spread out may have an impact when determining a preferred dumping position. For instance, if the material entity is relatively "fluid", the material entity is expected to spread out over a relatively large area in the receiver. As such, the exact dumping position may not have a significant effect on the loading condition of the receiver after the material entity has been dumped therein. In such a situation, the dumping position may be determined with regard to other factors, such as a desire to move the implement only a small distance between the source of material and the receiver in order to keep energy consumption to a relatively small level.

On the other hand, if the material entity is relatively "solid", the position at which the material entity is dumped will have a relatively large impact on the loading condition of the receiver.

Optionally, the material characteristic information comprises the density of the material entity. The density may have an impact on the loading condition, in particular as regards the weight and/or centre of gravity of the material loaded into the receiver.

Optionally, the material characteristic information comprises a friction angle of the material entity. As used herein, the "friction angle" is a shear strength parameter of the material entity. Generally, the friction angle may be derived from a Mohr-Coulumb failure criterion. The friction angle is used to describe the material entity's shear resistance. The friction angle may provide useful information as regards the material entity's ability to spread out when dumped from the implement.

Optionally, the control unit is adapted to determine at least one of the one or more properties of the material by determining a digging force needed to dig into a source of material from which the material entity is taken. The material entity is generally loaded into the implement during a digging procedure, as such it may be efficient to use the digging procedure also for determining at least one of the one or more properties of the material.

Optionally, the control unit is adapted to determine at least one of the one or more properties of the material by determining at least one of a vertical insertion depth of the implement into the source of material and the angle of the implement relative to a horizontal plane.

Optionally, the control unit is adapted to determine at least one of the one or more properties of the material using the digging force determined in a Mohr-Coulomb model and/or a Chen and Liu Upper Bound model.

Optionally, the loading operation information further comprises the location of the receiver.

Optionally, the loading operation information further comprises an inclination of the receiver.

Optionally, the control unit is adapted to, for each position of a set of predetermined different possible dumping positions within the receiver, simulate a new loading condition that the receiver would assume if the material entity would have been dumped in the dumping position using the material characteristic information, the control unit further being adapted to compare the new loading conditions obtained for each one of the different dumping positions and to select the dumping position on the basis of the comparison.

By virtue of the above simulations, prior to actually dumping the material entity from the implement into the receiver, a preferred dumping position may be determined.

Optionally, the control unit is adapted to determine a dumping result parameter indicative of the new loading condition. The dumping result parameter may be a useful measure of how appropriate or preferred a new loading condition is.

Optionally, the dumping result parameter comprises at least one of the centre of gravity and the uppermost position of the material.

Optionally, the receiver and the material that has been loaded into the receiver form a current material receiving surface, the control unit being adapted to determine characteristics of at least a portion of the material receiving surface.

Optionally, the control unit is adapted to, for each one of the plurality of different possible dumping positions within the receiver, simulate how the material entity will be spread over at least the above-mentioned portion of the material receiving surface.

A second aspect of the present invention relates to a control assembly for controlling the dumping of a material entity from an implement of a working machine into a receiver.

The control assembly comprises a control unit for controlling the dumping of a material entity from an implement of a working machine into a receiver. The control unit is adapted to determine a loading operation information comprising:

a current loading condition indicative of the distribution of the material that is currently accommodated by the receiver, and a material characteristic information comprising one or more properties of the material of the material entity that is present in the implement.

The control unit is adapted to, on the basis of the loading operation information, determine a dumping position within the receiver at which dumping position the material entity is to be dumped, the control assembly further comprising a receiver determining means for determining a current loading condition of the receiver and a material characteristics determining means for determining a material characteristic information of the material entity that is present in the implement.

Optionally, the receiver determining means comprises a receiver perception assembly for generating a surface model of the interior of the receiver and the material accommodated by the receiver, the receiver perception assembly preferably comprising at least one of a camera and a laser sensor.

Optionally, the receiver perception assembly is adapted to generate a three-dimensional surface model of the interior of the receiver and the material accommodated by the receiver.

Optionally, the receiver perception assembly comprises at least one of a time-of-flight camera, a stereo camera, a structured light camera and an actuated laser range finder.

Optionally, the material characteristics determining means comprises an implement load sensor and/or an implement inclination sensor.

Optionally, the material characteristics determining means comprises an implement perception assembly for generating a surface model of the material entity loaded into the implement, the receiver perception assembly preferably comprising at least one of a camera and a laser sensor.

A third aspect of the present invention relates to a working machine, such as an excavator or a wheel loader, comprising a control unit according to the first aspect of the present invention and/or a control assembly according to the second aspect of the present invention.

A fourth aspect of the present invention relates to a method for controlling the dumping of a material entity from an implement of a working machine into a receiver, the method comprising determining a loading operation information comprising:

a current loading condition indicative of the distribution of the material that is currently accommodated by the receiver, and a material characteristic information comprising one or more properties of the material of the material entity that is present in the implement.

Further, the method comprises, on the basis of the loading operation information, determining a dumping position within the receiver at which the material entity is to be dumped.

Optionally, the material entity comprises or substantially consists of granular material such as at least one of sand, soil, clay, earth and gravel.

Optionally, the method comprises determining the dumping position, on the basis of the loading operation information, each time a new material entity is intended to be dumped into the receiver.

Optionally, the material characteristic information comprises the density of the material entity.

Optionally, the material characteristic information comprises a friction angle of the material entity.

Optionally, the method comprises determining at least one of the one or more properties of the material by determining a digging force needed to dig into a source of material from which the material entity is taken.

Optionally, the method comprises determining at least one of the one or more properties of the material by determining at least one of a vertical insertion depth of the implement into the source of material and the angle of the implement relative to a horizontal plane.

Optionally, the method comprises determining the material property of the material characteristic using the digging force determined in a Mohr-Coulomb model and/or a Chen and Liu Upper Bound model.

Optionally, the loading operation information further comprises the location and/or an inclination of the receiver.

Optionally, the method comprises, for each one of a plurality of different possible dumping positions within the receiver, simulating a new loading condition that the receiver would assume if the material entity would have been dumped in the dumping position using the material characteristic information, the method further comprising comparing the new loading conditions obtained for each one of the different dumping positions and selecting the dumping position on basis of the comparison.

Optionally, the method comprises determining a dumping result parameter indicative of the new loading condition.

Optionally, the dumping result parameter comprises at least one of the centre of gravity and the uppermost position of the material.

Optionally, the receiver and the material currently loaded into the receiver form a current material receiving surface, the method comprising determining characteristics of at least a portion of the material receiving surface.

Optionally, the method comprises, for each one of the plurality of different possible dumping positions within the receiver, simulating how the material entity will be spread over at least the portion of the material receiving surface.

A fifth aspect of the present invention relates to a computer program comprising program code means for performing the steps of the fourth aspect of the present invention when the program is run on a computer.

A fifth aspect of the present invention relates to a computer readable medium carrying a computer program comprising program code means for performing the steps of the fourth aspect of the present invention when the program product is run on a computer.

BRIEF DESCRIPTION OF THE DRAWINGS

With reference to the appended drawings, below follows a more detailed description of embodiments of the invention cited as examples.

In the drawings.

It should be noted that the appended drawings are not necessarily drawn to scale and that the dimensions of some features of the present invention may have been exaggerated for the sake of clarity.

DETAILED DESCRIPTION

The invention will be described in the following for a working machine 10 in the form of an excavator such as the one illustrated in FIG. 1. The excavator 10 should be seen as an example of a working machine which could comprise a control unit and/or a control assembly according to the present invention and/or for which a method according to the present invention could be carried out. However, it should be pointed out that any aspect of the invention could be implemented for another type of working machine, such as a wheel loader (not shown) or the like.

Figure 1:
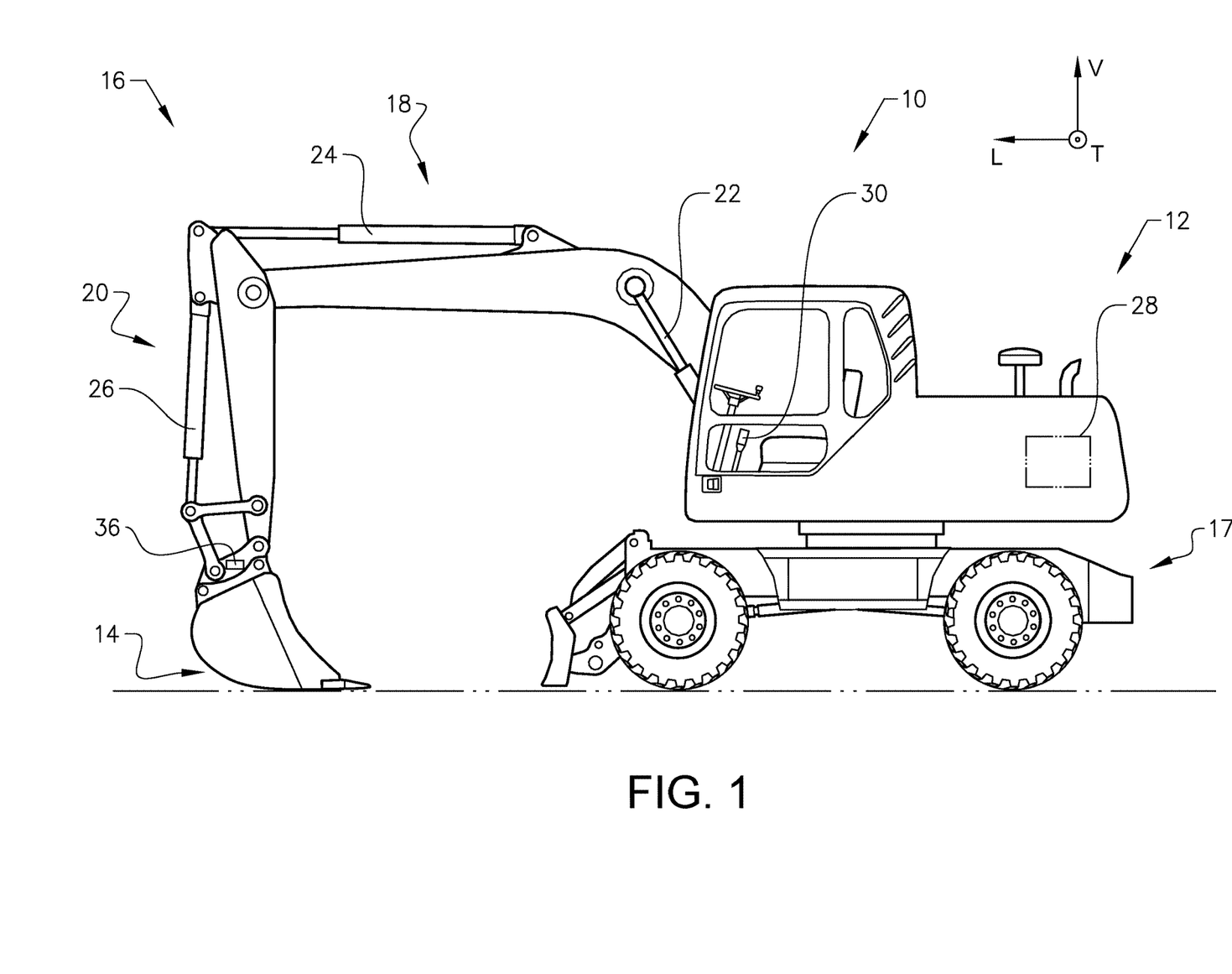
FIG. 1 is a schematic side view of a working machine.

The FIG. 1 working machine 10 comprises a main body 12, an implement 14 and a connector 16 connecting the implement 14 to the main body 12.

The implement 14 is movable relative to the main body 12. In FIG. 1, the connector 16 comprises a boom 18 and an arm 20. It should be noted that other working machines may comprise a connector with more or fewer components. For instance, it is envisaged that certain working machines, such as a wheeled excavator, may comprise a first boom (not shown) pivotally connected to the main body, a second boom (not shown) pivotally connected to the first boom and an arm pivotally connected to the second boom.

Purely by way of example, and as is indicated in FIG. 1, the implement 14 may be a bucket.

The main body 12 has a vertical extension in a vertical direction V. Moreover, and as is indicated in FIG. 1, the main body 12 also has an extension in a longitudinal dimension L in the intended drive direction of the working machine 10, and an extension in a transversal dimension T being perpendicular to each one of the vertical and longitudinal dimensions V, L.

Purely by way of example, and as is illustrated in FIG. 1, the boom 18 may be pivotally connected to the main body 12 and may be actuated by a boom actuator 22 connected to each one of the main body 12 and the boom 18. In a similar vein, the arm 20 may be pivotally connected to the boom 18 and may be actuated by an arm actuator 24 connected to each one of the boom 18 and the arm 20. Purely by way of example, at least one, alternatively both, of the boom actuator 22 and the arm actuator 24 may comprise a hydraulic cylinder, such as a double acting hydraulic cylinder. Additionally, the implement 14 may be moveable relative to the arm 20 by means of an implement actuator 26, e.g. a hydraulic implement actuator 26. For instance, the implement 14 may be pivotable relative to the arm 20.

The FIG. 1 working machine 10 further comprises a control unit 28. The FIG. 1 control unit 28 is exemplified as an electronic control unit that may be adapted to control working machine operations and/or to process data relevant for the operation of the working machine 10. As non-limiting and non-exhaustive examples, the feature "processing data" may include one or more of: determining, storing, transmitting or receiving data.

Purely by way of example, the control unit 28 may comprise a computer program comprising program code means for performing the computing steps of any one of the methods that will be presented hereinbelow. For instance, the control unit 28 may comprise a computer readable medium carrying a computer program comprising program code means for performing the computing steps of any one of the methods that will be presented hereinbelow.

Figure 2:
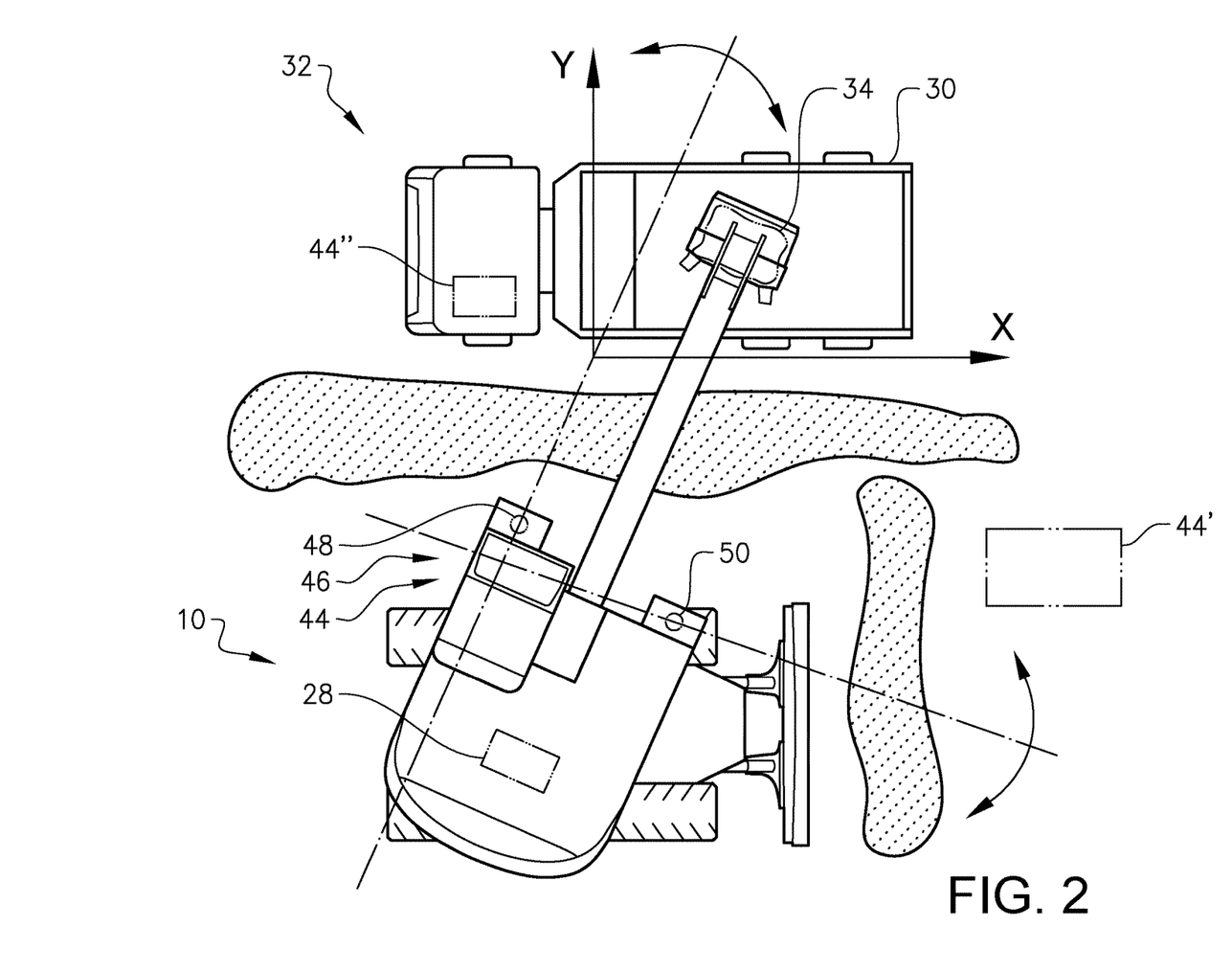
FIG. 2 is a schematic top view illustrating a working machine dumping material into a receiver.

A working machine 10, such as the example of a working machine 10 illustrated in FIG. 1, may be used for a plurality of assignments. One type of assignment may be to dump material into a receiver. To this end, FIG. 2 illustrates a top view of a working machine 10 and a receiver 30. In FIG. 2, the implementation of the working machine 10 corresponds to the FIG. 1 working machine 10. However, it should be emphasized that other types of working machines also can be used for moving material into a receiver. Moreover, in FIG. 2, the receiver 30 is illustrated as a loading platform of a vehicle 32 such as a truck, a hauler or the like. However, it is also envisioned that the receiver may be located on another type of moving object, such a carriage movable on rails (not shown), a belt or any other type of transport means (not shown). Further, it is also contemplated that the receiver 30 may be stationary.

The present invention relates to a control unit for controlling the dumping of a material entity from an implement of a working machine into a receiver. Purely by way of example, the control unit may be the above-mentioned control unit 28 associated with the working machine 10. However, it is also contemplated that the control unit may be positioned in another location. Purely by way of example, the control unit may be associated with the receiver 30. For instance, the control unit may be located in a device hosting the receiver, e.g. the previously mentioned vehicle. Furthermore, it is also envisioned that the control unit may be arranged separate from each one of the working machine and the receiver. In such an embodiment, the control unit preferably comprises means for communicating with the working machine 10 and/or equipment (not shown) associated with the receiver.

In order to simplify the below description of the invention, the control unit 28 of the working machine 10 is used as an example of the control unit that can carry out any one of the procedures outlined hereinbelow. However, it should be emphasized that the below description is equally applicable to other types and locations of control units.

The present invention relates to a control unit 28 for controlling the dumping of a material entity 34 from an implement 14 of a working machine 10 into a receiver 30. Purely by way of example, the material entity 34 may have been loaded into the implement 14 during a digging operation during which at least a portion of the implement has been moved through a source of material, such as a material pile or any other material unit, which is to be removed by a material moving procedure. As another option, the implement 14 may have been loaded with material using another type of procedure. For instance, material may have been loaded into the implement 14 using another implement (not shown) or the implement 14 may be filled with material from a material conveying belt (not shown).

Purely by way of example, the material entity may comprise or substantially consist of granular material such as at least one of sand, soil, clay, earth or gravel.

The control unit 28 according to the present invention is adapted to determine a loading operation information comprising:

a current loading condition indicative of the distribution of the material that is currently accommodated by the receiver 30, and a material characteristic information comprising one or more properties of the material of the material entity 34 that is present in the implement 14.

Moreover, the control unit 28 is adapted to, on the basis of the loading operation information, determine a dumping position within the receiver 30 at which dumping position the material entity 34 is to be dumped.

Purely by way of example, and as is indicated in FIG. 2, the horizontal extension of the receiver may be represented by a coordinate system. Purely by way of example, and as is indicated in FIG. 2, the coordinate system may be a horizontally extending Cartesian coordinate system with X- and Y-axes extending in a horizontal plane. However, it is also envisioned that another coordinate system, such as polar coordinate system be used instead.

Regardless of which coordinate system that is used for describing the receiver 30, the control unit 28 may be adapted to determine a set of coordinates X;Y, alternatively a set of coordinate ranges [Xmin–Xmax; Ymin–Ymax], representing the position at which the material entity 34 is to be dumped.

As will be discussed in more detail hereinbelow, the position at which the material entity 34 is to be dumped may be determined with an aim to obtain an appropriate loading condition of the receiver. Purely by way of example, an appropriate loading condition may be defined in terms of an appropriate centre of gravity of the material accommodated by the receiver 30 once the material entity 34 has been dumped into the receiver 30 and/or in terms of a preferred shape of the material, for instance a preferred shape of the surface of the material, accommodated by the receiver 30 once the material entity 34 has been dumped into the receiver 30.

The material characteristic information may for instance comprise information indicative of how the material entity will spread out when dumped from the implement 14. In other words, the material characteristic information may be indicative of how "fluid" the material entity is. Thus, the inventor of the present invention has realized that the material's ability to spread out when dumped from the implement 14 may be relevant to take into account when determining the position at which the material entity 34 is to be dumped.

As a first non-limiting example, if the material entity 34 is determined to spread out substantively all over the material previously loaded into the receiver, for instance if it is determined that the material of the material entity 34 is relatively "fluid", the position at which the material is dumped into the receiver may not have a significant impact on the shape of the material loaded into the receiver 30. In such an event, the control unit 28 may for instance determine a dumping position that results in only a relatively small movement of the implement 14 from the source of material to the receiver 30.

On the other hand, as a second non-limiting example, if the material entity 34 is determined to spread out to only a limited extent, for instance if it determined that the material of the material entity 34 is relatively "viscous" or even relatively solid, the position at which the material is dumped into the receiver may have a relatively large impact on the shape of the material accommodated by the receiver 30 after the material entity 34 has been dumped into the receiver 30.

Preferably, the control unit 28 is adapted to determine the dumping position, on the basis of the loading operation information, each time a new material entity is intended to be dumped into the receiver 30. As such, the control unit may be adapted to determine the material characteristic information comprising one or more properties of the material of the material entity 34 for each material entity 34 that is loaded into the receiver.

The above implementation can be useful in a loading situation when moving material from an inhomogeneous source of material to the receiver. Purely by way of example, if material is to be moved from a pile of material to a receiver, an upper portion of the pile may be relatively "fluid" but the bottom portion of the pile may have been compacted by the weight of the upper portion and consequently may be less "fluid".

As a non-limiting example, the material characteristic information may comprise the density and/or a friction angle of the material entity 34.

The density and/or a friction angle of the material entity may be determined by determining the type of material in the material entity 34 and determine a density and/or a friction angle associated with that material type.

However, instead of, or in addition to, determining the density and/or friction angle on the basis of the material type, the density and/or a friction angle may be determined taking the compaction of the material entity 34 into account. As a non-limiting example, the volume and the mass of the material entity 34 present in the implement 14 may be evaluated and the density of the material entity 34 may be determined using the volume and mass thus established.

Moreover, if the material type is determined and a current density of the material entity 34 also has been determined, it is envisioned that a compaction parameter indicative of the degree of compaction of the material of the material entity 34 may be determined by comparing a nominal density associated with the material type and the current density. Such a compaction parameter may for instance be used for modifying nominal material parameters, such as a nominal friction angle, in order to take the determined degree of compaction into account.

Although it has been indicated hereinabove that the loading operation information comprises a current loading condition and a material characteristic information, it is envisaged that the loading operation information may comprise additional information. As a non-limiting example, the loading operation information may further comprise the location and/or inclination of the receiver 30. The location and/or inclination of the receiver 30 can be used when estimating how the material entity 34 will distribute itself in the receiver 30.

The control unit 28 that have been presented hereinabove may form part of a control assembly 38. The control assembly may comprise a receiver determining means 44 for determining a current loading condition of the receiver 30 and a material characteristics determining means 52 (see FIG. 3) for determining a material characteristic information of the material entity that is present in the implement.

Purely by way of example, and as is indicated in FIG. 2, the receiver determining means 44 may comprise a receiver perception assembly 46 for generating a surface model of the interior of the receiver 30 and the material accommodated by the receiver 30. The receiver perception assembly 46 may for instance comprise at least one of a camera and a laser sensor. In the FIG. 2 embodiment, the perception assembly 46 comprises two sub-assemblies 48, 50 located on either side of a longitudinal axis of the working machine 10.

Purely by way of example, the receiver perception assembly 46 comprises at least one of a time-of-flight camera, a stereo camera, a structured light camera and an actuated laser range finder.

Preferably, the receiver perception assembly 46 is adapted to generate a three-dimensional surface model of the interior of the receiver 30 and the material accommodated by the receiver. As a non-limiting example, the receiver perception assembly 46 may be adapted to perform a point cloud measurement (not shown) of the interior of the receiver 30 and the material accommodated by the receiver. Moreover, though purely by way of example, the receiver perception assembly 46 may be adapted to generate a surface model (not shown), e.g. a surface mesh, and/or a volume model, e.g. a volume mesh, of the material accommodated by the receiver 30.

The receiver determining means 44 is in communication with the control unit 28, for instance by means of a wire based and/or a wireless communication means (not shown). It should be emphasized that although the receiver determining means 44 is illustrated as being associated with the working machine in FIG. 2, it is also contemplated that the embodiments of the control assembly 38 comprise a receiver determining means 44 that is located in another position.

In FIG. 2, two alternative implementations of the receiver determining means 44 are illustrated. A first alternative implementation is that a receiver determining means 44' be located on a stationary object, e.g. a mast (not shown) or the like, at a position from which a clear view of the receiver 30 may be obtained. A second alternative implementation is that a receiver determining means 44" be connected to the receiver 30. In FIG. 2, the receiver determining means 44" in accordance with the second alternative implementation is connected to the vehicle 32 hosting the receiver 30. In any one of the first and second implementations, the corresponding receiver determining means 44', 44" is in communication, preferably in wireless communication, with the control unit 28.

Although a receiver determining means 44 has been exemplified hereinabove as comprising a receiver perception assembly, other types of sensors are also envisioned. Purely by way of example, implementations of the receiver determining means 44 may comprise one or more load sensors (not show). Purely by way of example, the one or more load sensors may be located on a material receiving side of the receiver 30.

The previously discussed material characteristic information may be determined in a plurality of ways. For instance, it is envisioned that the control unit 28 may be in communication with a material characteristics determining means 52 comprising sensors (not shown) adapted to determine one or more properties of the material of the material entity 34.

Purely by way of example, the control unit 28 may be in communication with an implement perception assembly 59 for generating a surface model of the material entity 34 loaded into the implement 14. Purely by way of example, the receiver perception assembly 59 may comprise at least one of a camera and a laser sensor. For instance, the control unit 28 may be adapted to use information relating to e.g. the colour and/or structure of the material entity 34 and from that information determine the type of material of the material entity. As another option, the image may be used for determining the shape that the material entity 34 assumes in the implement 14 in order to obtain information indicative of how the material has been distributed in the implement 14. As a non-limiting example, if the material entity 34 in the implement 14 has a substantially flat upper surface, it can be assumed that the material entity 34 is capable of spreading out relatively well.

Instead of, or in addition to the above implementations, the control unit 28 may be adapted to determine at least one of the one or more properties of the material by determining a digging force needed to dig into a source of material from which the material entity is taken.

Figure 3:
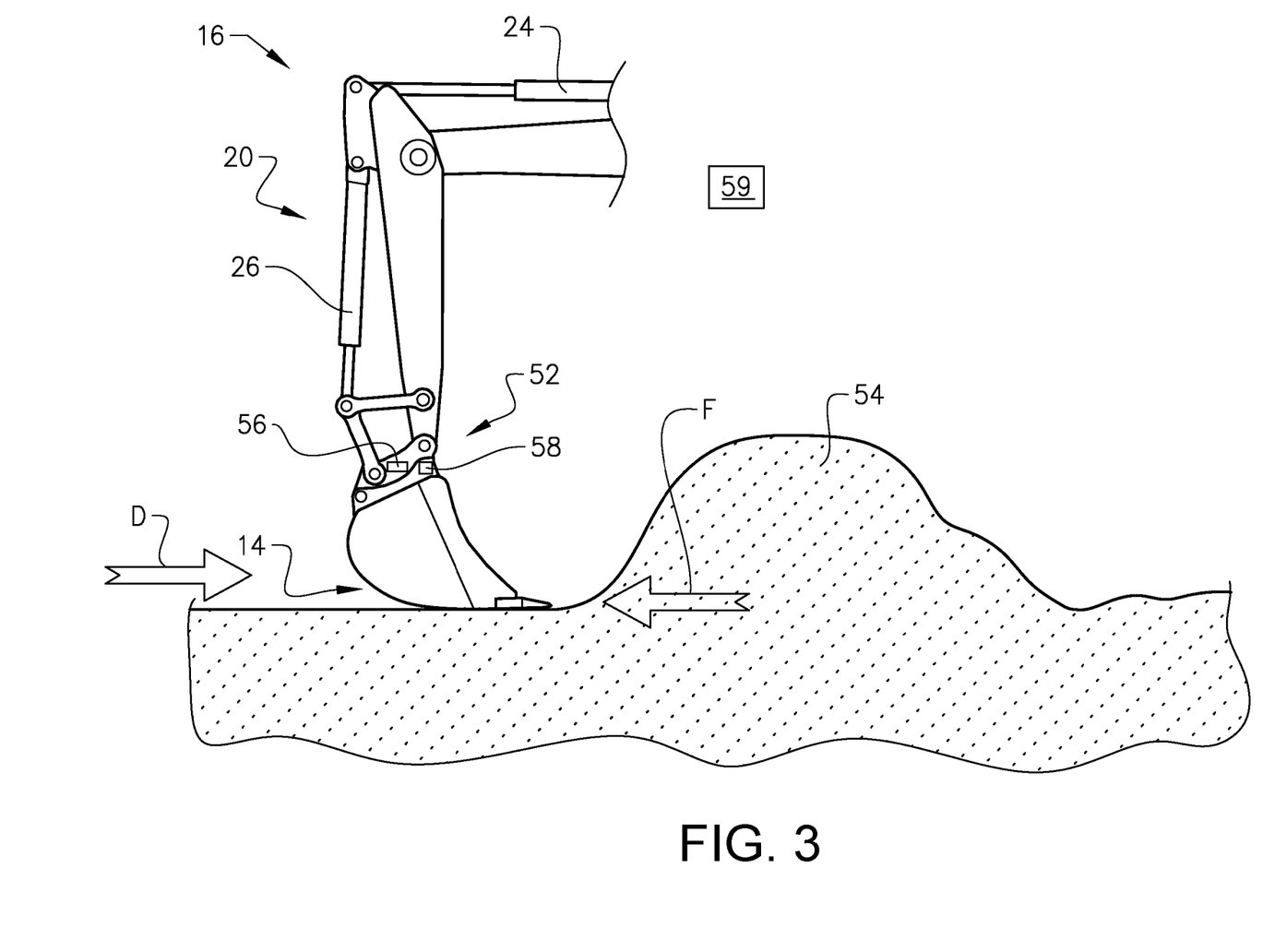
FIG. 3 schematically illustrates an implement of a working machine that digs into a source of material.

To this end, reference is made to FIG. 3 illustrating an implement 14 that is in the process of being moved through a portion of a pile 54. The implement 14 is moved in a direction D resulting in that a reaction force F may be exerted on the implement 14. The magnitude of the force F may be determined by an implement load sensor 56 which may form part of, or even constitute, the material characteristics determining means 52. Moreover, the implement load sensor 56 may be adapted to determine the direction of the force F. The material characteristics determining means 52 may also comprise an implement inclination sensor 58 adapted to determine the inclination of the implement 14.

Using information indicative of the magnitude and/or direction of the force, it may be possible to determine the type of material in the material entity 34. Purely by way of example, a look-up table may be used for determining the type of material. Once the material type is determined, material characteristics such as the material's ability to spread out when dumped from the implement 14 may be determined.

As another example, instead of, or in addition to, using the information indicative of the magnitude and/or direction of the force in a look-up table, the above information may be used directly in order to determine e.g. the material's ability to spread out. As a non-limiting example, the control unit 28 may be adapted to use a relation between the magnitude of the reaction force F and the ability to spread out.

In addition to, or instead of, using information indicative of the reaction force F, embodiments of the control unit 28 may be adapted to determine at least one of the one or more properties of the material by determining at least one of a vertical insertion depth of the implement 14 into the source of material and the angle of the implement relative to a horizontal plane.

Purely by way of example, the control unit 28 may be adapted to determine at least one of the one or more properties of the material using the digging force determined in a Mohr-Coulomb model and/or a Chen and Liu Upper Bound model.

The control unit 28 may be adapted to, for each position of a set of predetermined different possible dumping positions within the receiver, simulate a new loading condition that the receiver would assume if the material entity would have been dumped in the dumping position using the material characteristic information.

Figure 4:
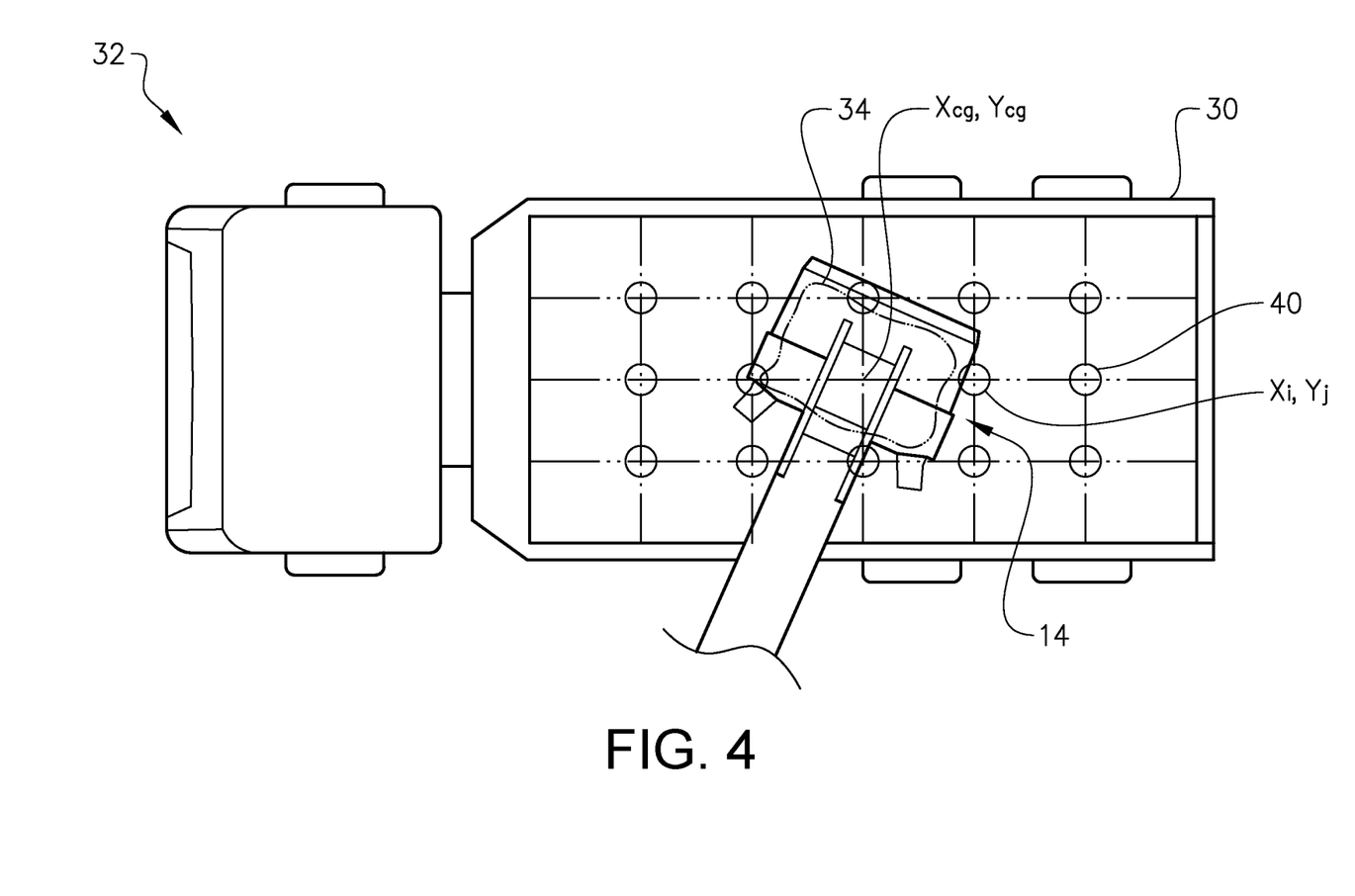
FIG. 4 schematically illustrates a condition in which a implement is about to dump material into a receiver.

To this end, reference is made to FIG. 4 which illustrates the FIG. 2 receiver 30 and implement 14. In FIG. 4, a set of predetermined different possible dumping positions {xi,yj} has been predetermined for the receiver 30. In the FIG. 4 example, the dumping positions xi,yj are evenly distributed over the area of the receiver 30. Furthermore, in FIG. 4, the dumping positions xi,yj constitute nodes in a uniform mesh 38 over the area of the receiver 30.

Moreover, the receiver 30 and the material presently accommodated by the receiver 30 form a current material receiving surface, and the control unit 28 may be adapted to determine characteristics of at least a portion of the current material receiving surface.

Purely by way of example, characteristics of the material receiving surface may comprise a set of cloud points of the material receiving surface (not shown) and/or a surface mesh representing the material receiving surface (not shown).

It is also envisioned that the dumping positions xi,yj may be unevenly distributed over the area of the receiver 30. Purely by way of example, the dumping positions xi,yj may be selected adaptively on a regular basis, e.g. prior to every dump from the implement 14. As a non-limiting example, if it is identified that the above-mentioned material receiving surface comprises a sub-area with large gradients, e.g. steep portions of material or the like, it may be preferred to increase the density of possible dumping positions xi,yj in such a sub-area.

Purely by way of example, for each possible dumping position, the control unit 28 may be adapted to simulate a new loading condition that the receiver 30 would assume if the material entity would have been dumped in the dumping position xi,yj using the material characteristic information.

To this end, the control unit 28 may be adapted to, for each one of the plurality of different possible dumping positions xi,yj within the receiver, simulate how the material entity 34 will be spread over at least a portion of the material receiving surface. As a non-limiting example, the control unit 28 may be adapted to use information as regards the current material receiving surface and the information indicative of how the material entity 34 will spread out when dumped from the implement 14 in order to simulate the new loading condition. For instance, the control unit 28 may be adapted to use a discrete element method (DEM) software for such a simulation. As another option, the control unit 28 may be adapted to use a finite element method (FEM) software for such a simulation.

The control unit 28 may further be adapted to compare the new loading conditions obtained for each one of the different dumping positions xi,yj and to select the dumping position on the basis of the comparison. As an example of the above comparison, the control unit 28 may adapted to determine a dumping result parameter indicative of the new loading condition. Purely by way of example, the dumping result parameter may comprise at least one of the centre of gravity and the uppermost position of the material loaded into the receiver.

As an example, the control unit 28 may be adapted to select the dumping position from the different possible dumping positions xi,yj by selecting the dumping position that results in an appropriate horizontal centre of gravity of the material loaded into the receiver. Generally, such an appropriate horizontal centre of gravity may be a centre of gravity that is located close to the horizontal centre xcg,ycg of the material receiving portion of the receiver 30.

Thus, as a non-limiting example, the simulated centre of gravity xmi,ymj of the total material loaded into the receiver 30 for each one of the different possible dumping positions xi,yj may be determined. The horizontal distance hij from the material's centre of gravity to the receiver's centre of gravity may be determined using for instance the following equation:

$$h_{ij} = \sqrt{(x_{mi} - x_{cg})^2 + (y_{mj} - y_{cg})^2} \qquad \text{(Eq. 1)}$$

A dumping position may be selected which has a horizontal distance hij being lower than a predetermined threshold value. Optionally, the dumping position may be selected as the dumping position of the different possible dumping positions xi,yj which result in the minimum horizontal distance hij.

Instead of, or in addition to, selecting the dumping position on the basis of a preferred horizontal distance hij, the dumping position may be selected as the position for which a lowest uppermost position of the material accommodated by the receiver 30 after the material entity 34 has been dumped into the receiver 30 is simulated.

A dumping position may be selected which has an uppermost position vij that is lower than a predetermined threshold value. Optionally, the dumping position may be selected as the dumping position of the different possible dumping positions xi,yj which results in the minimum uppermost position vi.

Figure 5A:
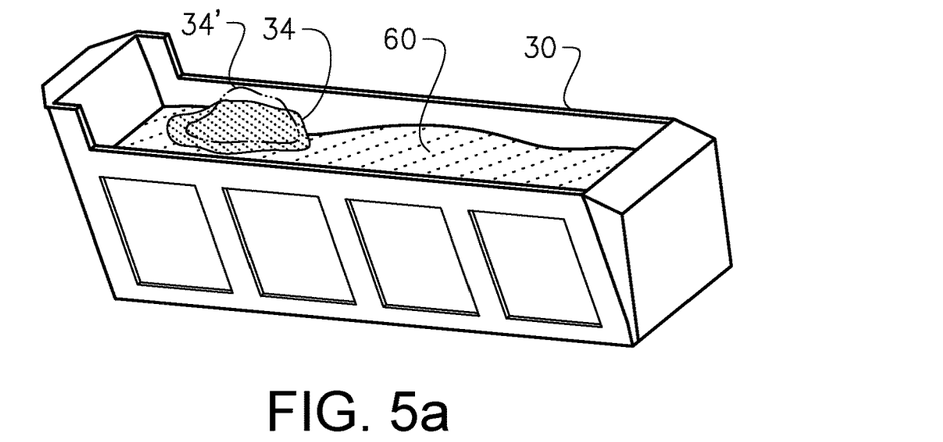
FIG. 5A to 5C schematically illustrate simulations of the dumping of a material entity into a receiver.
Figure 5B:
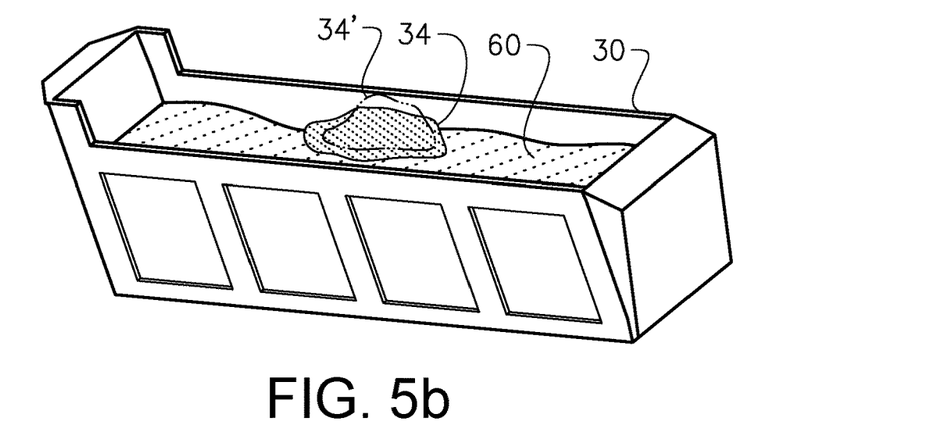
Figure 5C:
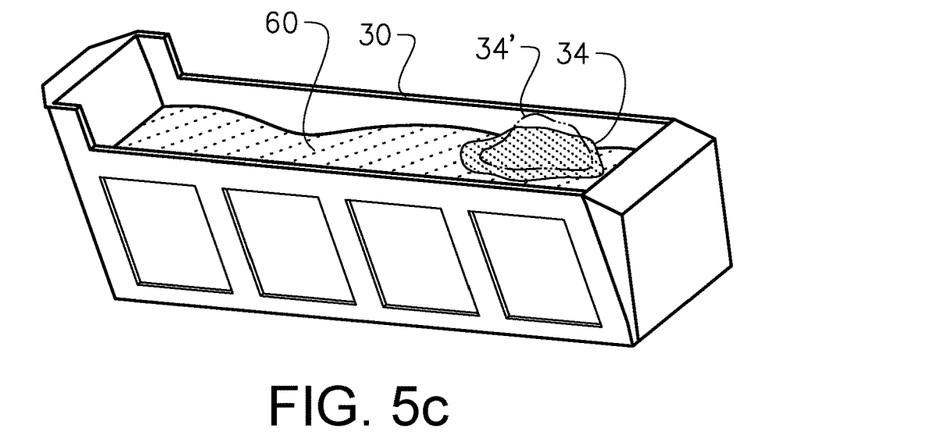

FIG. 5A to FIG. 5C illustrate a receiver that accommodates a material body 60. Moreover, each one of FIG. 5A to 5C illustrates a condition simulating a material entity 34 that has been dumped into the receiver. In each one of FIG. 5A to 5C, as well as in each one of FIG. 6A to FIG. 6C discussed hereinbelow, reference numeral 34' indicates the shape that the material entity assumed in the implement 14 when being transported from the source of material to the receiver 30.

Moreover, in the example in FIG. 5A to FIG. 5C, the material entity is relatively "viscous" resulting in that the material entity 34 is not expected to spread out to any large extent after being dumped into the receiver 30. This illustrated in FIG. 5 to FIG. 5C since the shape 34' is rather similar to the shape of the material entity 34 even after the material entity has been dumped into the receiver 30. As such, and as may be gleaned from FIG. 5A-FIG. 5C, the material entity 34 is simulated to substantially remain in the dumping position. Consequently, the dumping position will have a significant impact on the new simulated loading condition. As a non-limiting example, a control unit 28 may select the dumping position indicted in FIG. 5B since that dumping position has a relatively small impact on the centre of gravity of the material in the receiver 30.

Figure 6A:
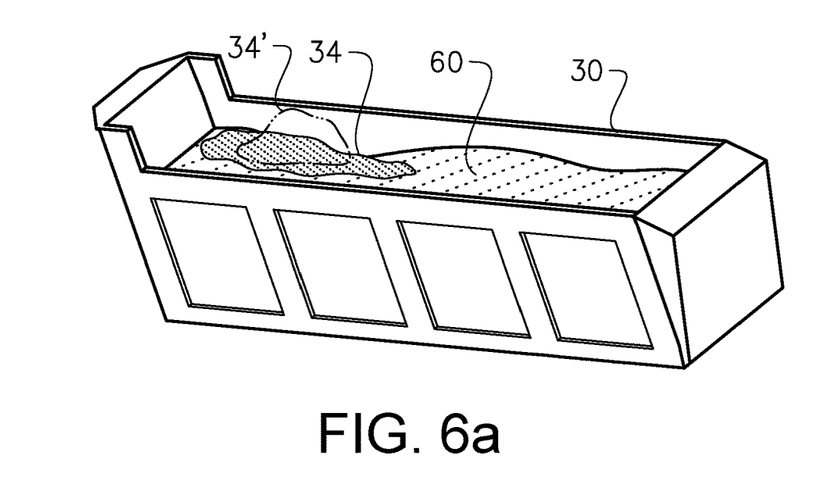
FIG. 6A to 6C schematically illustrate simulations of the dumping of a material entity into a receiver.
Figure 6B:
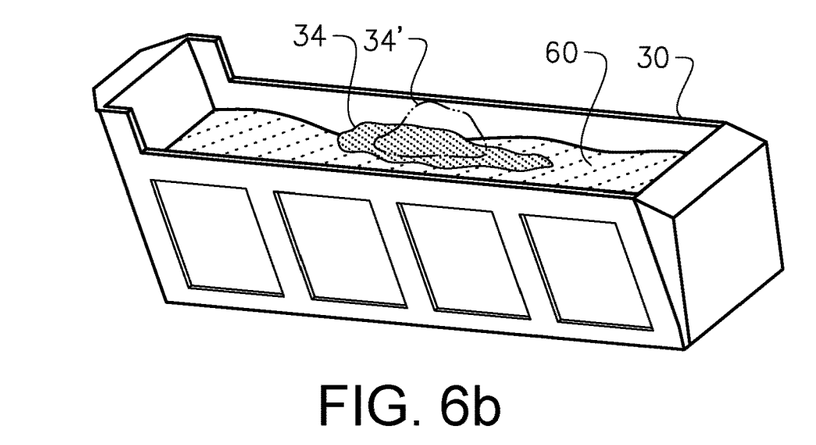
Figure 6C:
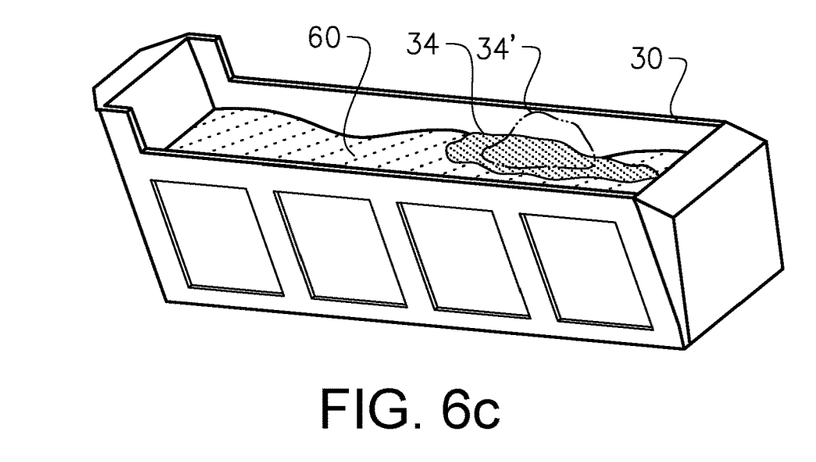

FIG. 6A to FIG. 6C illustrate another loading situation in which a material entity 34 which is relatively "fluid" is simulated to be dumped into a receiver 30. As may be gleaned from FIG. 6A to FIG. 6C, since the material entity 34 is capable of spreading out to a large extent when dumped from an implement, the material entity 34 is simulated to be distributed over a relatively large area of the material already loaded into the receiver 30. As such, the load condition simulated in each one of FIG. 6A to FIG. 6C is relatively similar resulting in that any one of the dumping positions can be used.

Figure 7:
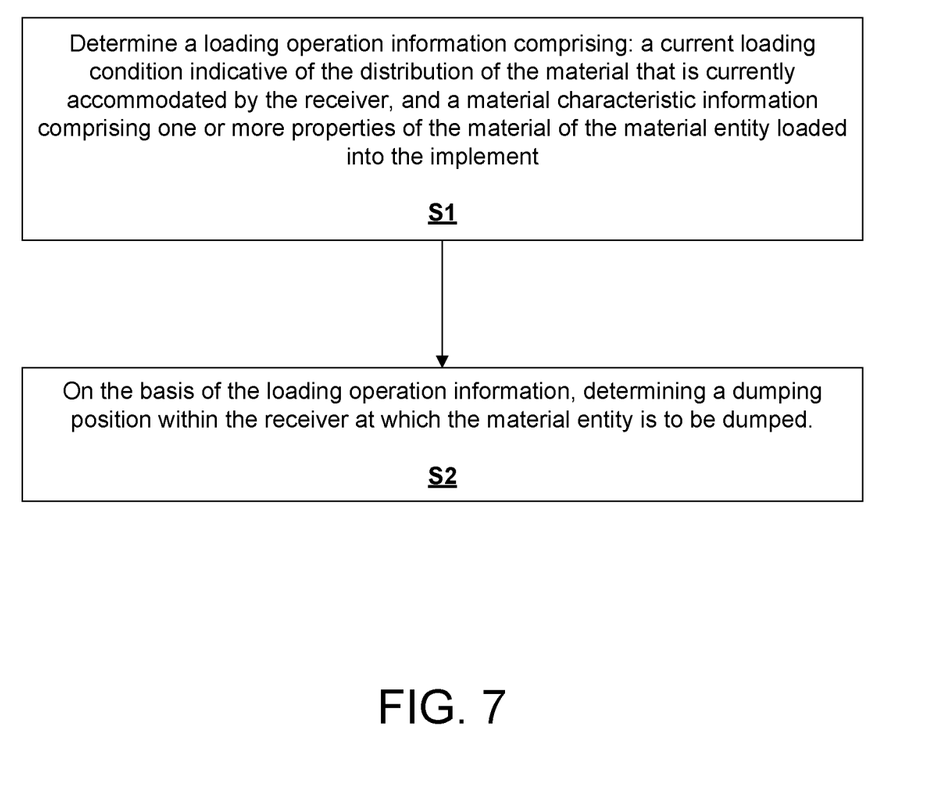
FIG. 7 is a flow chart representing an embodiment of a method according to the invention.

Finally, FIG. 7 illustrates a flow chart illustrating a method in accordance with a third aspect of the present invention. The third aspect relates to a method for controlling the dumping of a material entity 34 from an implement of a working machine 10 into a receiver 30.

The Method Comprises

S1: determining a loading operation information comprising:
a current loading condition indicative of the distribution of the material that is currently accommodated by the receiver, and
a material characteristic information comprising one or more properties of the material of the material entity loaded into the implement, S2: on the basis of the loading operation information, determining a dumping position within the receiver at which the material entity is to be dumped.

It is to be understood that the present invention is not limited to the embodiments described above and illustrated in the drawings; rather, the skilled person will recognize that many changes and modifications may be made.

The invention claimed is:

1. A control unit for controlling a dumping of a material entity from an implement of a working machine into a receiver, wherein the control unit is adapted to:
determine a loading operation information comprising:
a current loading condition indicative of a distribution of an accommodated material that is currently accommodated by the receiver, and
a material characteristic information comprising one or more properties of the material entity that is present in the implement;
determine at least one of the one or more properties of the material entity by determining a digging force needed to dig into a source material from which the material entity is taken; and
based on the loading operation information, determine a dumping position within the receiver at which dumping position the material entity is to be dumped; and
operate the implement to:
take the material entity from the source material based on the determined at least one of the one or more properties of the material entity; and
dump the material entity at the determined dumping position within the receiver.

2. The control unit according to claim 1, wherein the material entity comprises a granular material.

3. The control unit according to claim 1, wherein the control unit is adapted to determine the dumping position, based on the loading operation information, each time a new material entity is intended to be dumped into the receiver.

4. The control unit according to claim 1, wherein the material characteristic information comprises information indicative of how the material entity will spread out when dumped from the implement.

5. The control unit according to claim 1, wherein the material characteristic information comprises a density of the material entity.

6. The control unit according to claim 1, wherein the material characteristic information comprises a friction angle of the material entity.

7. The control unit according to claim 6, wherein the control unit is adapted to determine at least one of the one or more properties of the material entity by determining at least one of a vertical insertion depth of the implement into the source material and an angle of the implement relative to a horizontal plane.

8. The control unit according to claim 6, wherein the digging force is determined in at least one of a Mohr-Coulomb model and a Chen and Liu Upper Bound model.

9. The control unit according to claim 1, wherein the loading operation information further comprises a location of the receiver.

10. The control unit according to claim 1, wherein the loading operation information further comprises an inclination of the receiver.

11. The control unit according to claim 1, wherein the control unit is adapted to, for each position of a set of predetermined different possible dumping positions within the receiver, simulate a new loading condition that the receiver would assume if the material entity would have been dumped in the dumping position using the material characteristic information, the control unit further being adapted to compare the new loading conditions obtained for each one of the plurality of different possible dumping positions and to select the dumping position based on the comparison.

12. The control unit according to claim 11, wherein the control unit is adapted to determine a dumping result parameter indicative of the new loading condition.

13. The control unit according to claim 12, wherein the dumping result parameter comprises at least one of a center of gravity and an uppermost position of the material entity.

14. The control unit according to claim 1, wherein the receiver and the accommodated material currently accommodated by the receiver form a current material receiving surface, the control unit being adapted to determine characteristics of at least a portion of the current material receiving surface.

15. The control unit according to claim 14, wherein the control unit is adapted to, for each one of a plurality of different possible dumping positions within the receiver, simulate how the material entity will be spread over at least the portion of the current material receiving surface.

16. A control assembly for controlling a dumping of a material entity from an implement of a working machine into a receiver, the control assembly comprising:
a control unit for controlling the dumping of a material entity from an implement of a working machine into a receiver, wherein the control unit is adapted to:
determine a loading operation information comprising:

a current loading condition indicative of a distribution of an accommodated material that is currently accommodated by the receiver, and a material characteristic information comprising one or more properties of the material entity that is present in the implement; and determine at least one of the one or more properties of the material entity by determining a digging force needed to dig into a source material from which the material entity is taken;

based on the loading operation information, determine a dumping position within the receiver at which dumping position the material entity is to be dumped; and operate the implement to:
take the material entity from the source material based on the determined at least one of the one or more properties of the material entity; and
dump the material entity at the determined dumping position within the receiver;

a receiver determining means for determining the current loading condition; and a material characteristics determining means for determining the material characteristic information.

17. The control assembly according to claim 16, wherein the receiver determining means comprises a receiver perception assembly adapted to generate a surface model of an interior of the receiver and the accommodated material accommodated by the receiver, the receiver perception assembly comprising at least one of a camera and a laser sensor.

18. The control assembly according to claim 17, wherein the receiver perception assembly is adapted to generate a three-dimensional surface model of the interior of the receiver and the accommodated material accommodated by the receiver.

19. The control assembly according to claim 18, wherein the receiver perception assembly comprises at least one of a time-of-flight camera, a stereo camera, a structured light camera, and an actuated laser range finder.

20. The control assembly according to claim 16, wherein the material characteristics determining means comprises an implement load sensor and/or an implement inclination sensor.

21. The control assembly according to claim 16, wherein the material characteristics determining means comprises an implement perception assembly for generating a surface model of the material entity loaded into the implement, the implement perception assembly comprising at least one of a camera and a laser sensor.

22. A working machine comprising a control unit according to claim 1.

23. A method for controlling a dumping of a material entity from an implement of a working machine into a receiver, wherein the method comprises determining a loading operation information comprising:
a current loading condition indicative of a distribution of an accommodated material that is currently accommodated by the receiver, and
a material characteristic information comprising one or more properties of the material entity loaded into the implement;

determining at least one of the one or more properties of the material entity by determining a digging force needed to dig into a source material from which the material entity is taken;

based on the loading operation information, determining a dumping position within the receiver at which the material entity is to be dumped; and operating the implement to:
take the material entity from the source material based on the determined at least one of the one or more properties of the material entity; and
dump the material entity at the determined dumping position within the receiver.

24. The method according to claim 23, wherein the material entity comprises a granular material.

25. The method according to claim 23, wherein the method comprises determining the dumping position, based on the loading operation information, each time a new material entity is intended to be dumped into the receiver.

26. The method according to claim 23, wherein the material characteristic information comprises a density of the material entity.

27. The method according to claim 23, wherein the material characteristic information comprises a friction angle of the material entity.

28. The method according to claim 23, wherein the method comprises determining at least one of the one or more properties of the material entity by determining at least one of a vertical insertion depth of the implement into the source material and an angle of the implement relative to a horizontal plane.

29. The method according to claim 23, wherein the digging force is determined in at least one of a Mohr-Coulomb model and a Chen and Liu Upper Bound model.

30. The method according to claim 23, wherein the loading operation information further comprises at least one of a location and an inclination of the receiver.

31. The method according to claim 23, wherein the method comprises, for each one of a plurality of different possible dumping positions within the receiver, simulating a new loading condition that the receiver would assume if the material entity would have been dumped in the dumping position using the material characteristic information, the method further comprising comparing the new loading conditions obtained for each one of the plurality of different dumping positions and selecting the dumping position based on the comparison.

32. The method according to claim 31, wherein the method comprises determining a dumping result parameter indicative of the new loading condition.

33. The method according to claim 32, wherein the dumping result parameter comprises at least one of a center of gravity and an uppermost position of the material entity.

34. The method according to claim 23, wherein the receiver and the accommodated material currently accommodated by the receiver form a current material receiving surface, the method comprising determining characteristics of at least a portion of the current material receiving surface.

35. The method according to claim 34, wherein the method comprises, for each one of the plurality of different possible dumping positions within the receiver, simulating how the material entity will be spread over at least the portion of the current material receiving surface.

36. A computer comprising a computer program for performing the steps of claim 23 when the program is run on the computer.

37. A non-transitory computer readable medium carrying a computer program product for performing the steps of claim 23 when the program product is run on a computer.

* * * * *